United States Patent [19]

Britton et al.

[11] Patent Number: 5,695,153
[45] Date of Patent: Dec. 9, 1997

[54] LAUNCHER SYSTEM FOR AN UNMANNED AERIAL VEHICLE

[75] Inventors: Ken G. Britton, Huntsville; Don O. Schaper, Madison, both of Ala.

[73] Assignee: Northrop Grumman Corporation, Los Angeles, Calif.

[21] Appl. No.: 559,056

[22] Filed: Nov. 16, 1995

[51] Int. Cl.$^6$ ............................................. B64F 1/04
[52] U.S. Cl. ............................................. 244/63; 124/63
[58] Field of Search ........................ 244/63; 124/63, 124/65, 61, 56, 73

[56] References Cited

U.S. PATENT DOCUMENTS

| | | | |
|---|---|---|---|
| 2,315,242 | 3/1943 | Briggs et al. | 124/65 |
| 2,611,355 | 9/1952 | Ashwood | 244/63 |
| 2,735,391 | 2/1956 | Buschers | 244/63 |
| 2,843,020 | 7/1958 | Bertagna et al. | 244/63 |
| 2,843,342 | 7/1958 | Ward | 244/63 |
| 2,843,343 | 7/1958 | Ward | 244/63 |
| 2,922,602 | 1/1960 | Matheisel et al. | 244/63 |
| 3,138,352 | 6/1964 | Saholt | 244/63 |
| 3,645,407 | 2/1972 | Przybylski | |
| 3,968,947 | 7/1976 | Schlegel et al. | 244/63 |
| 4,582,335 | 4/1986 | Paioli et al. | |

OTHER PUBLICATIONS

MI-TEX & Frazer-Nash Defense Systems, "Unmanned Aerial Vehicle Launching", *Industry Insight*, Fall 1992, p. 27.
By The Staff of Engineered Systems (ESCO)-A Datron Division, "State-of-The-Art Rail Launchers For Unmanned Aerial Vehicles", *Industry Update*, Fall 1992, pp. 35–37.
Stanley W. Kandebo, "Cypher Moves Toward Autonomous Flight", Aviation Week & Space Technology, A McGraw-Hill Publication, Mar. 7, 1994.
CL-227 Sentinel, Baseline HMMWV-Trailer Configuration.
Bell Eagle Eye TiltRotor UAV, Bell Helicopter Textron.
Twinwing-The Joint Tactical UAV Maneuver Solution, Alliant Tech Systems.
Pioneer America's Deployed UAV System, Pioneer UAV, Inc., 1995.
AV Pointer-Airborne Environmental Survey System, AeroVironment Inc., 1995.
Scorpion Freewing Tilt-Body™ UAV, Freewing Aerial Robotics Corporation, Feb. 1995.
Remotely Piloted Vehicle Launcher, Frazer-Nash Defence Systems Division.
HUNTAIR Unmanned Aerial Vehicle, Remote Systems & Technologies, Westinghouse Electric Corporation.
"Joint Tactical Unmanned Aerial Vehicle (JT-UAV) Maneuver Variant", Raytheon Electronic Systems, Product Data Sheet-Electronic Systems, 95–69 (Jul. 1995).

*Primary Examiner*—Andres Kashnikow
*Assistant Examiner*—Tien Dinh
*Attorney, Agent, or Firm*—Walter G. Sutcliff

[57] ABSTRACT

A launch system for an unmanned aerial vehicle (UAV) that is contained in a portable trailer where all the components of the launch platform can be unfolded and/or attached to each other by hand using removable pins attached to the platform by lanyards. The platform includes launch extension mechanisms that insure a proper launch angle. Wing rails that fold into and are pinned into position to support the UAV before a launch. The launcher also includes a crane that provides a fixed position lifting crank and a movable boom with a lifting cable that is not exposed to getting tangled during movements of the boom when positioning the UAV on the launcher. The trailer has an air compressor and air tanks, and a foot operated release valve that supplies compressed air for a piston based launch mechanism that is controlled by the pilot. The system includes enclosed compartments that are capable of storing components for several vehicles. The system also includes an aircraft starter mechanism that can be slidably positioned for starting a motor of the aircraft by the pilot.

11 Claims, 7 Drawing Sheets

LAUNCHER SYSTEM FOR AN UNMANNED AERIAL VEHICLE

CROSS REFERENCE TO RELATED APPLICATION

This application is related to the concurrently filed application entitled A Portable Unmanned Aerial Vehicle, Ser. No. 08/561,929, filed Nov. 22, 1995 assigned to the same assignee as the present invention.

BACKGROUND OF THE INVENTION

1. Field of the Invention

The present invention is directed to an unmanned aerial vehicle launch system that can be assembled without tools and, more particularly, to a system in which components unfold and lock in place or are attached in place using locking pins so that no tools are needed, and in which the system includes compartmented storage space for the vehicle parts for multiple vehicles and for a launching propulsion system that is self supporting, and in which assembly, starting and launching can be performed by a single person.

2. Description of the Related Art

An unmanned aerial vehicle (UAV) used for surveillance must be portable and launchable from very small areas often near the front lines of a military force. These units must be small in the number of personnel required to avoid detection by the enemy and must be capable of launch system setup in environments where a tool or fastener that is dropped may not be found. These units can also be very important to the security of a military force and so must be highly reliable. Typical launchers require that special tools be used in the assembly. Typical launchers also use cable launch or rocket propelled launch mechanisms that require multiple people to operate or require special propellants making such systems impractical.

As a result, what is needed is a self contained and self supporting launcher which includes storage for several vehicles, that can be set up rapidly by a single individual and that requires no tools and in which a single individual can start, launch and fly the aircraft.

SUMMARY OF THE INVENTION

It is an object of the present invention to provide a launcher for an unmanned aerial vehicle that can be assembled without tools.

It is another object of the present invention to provide a launcher that can be assembled by a single person.

It is also an object of the present invention to provide a launcher that allows starting and launching by a single person who also controls the flight of the vehicle.

It is still another object of the present invention to provide a launcher that will carry several aircraft.

It is a further object of the present invention to provide a launcher that provides its own launch propulsion gas supply making the unit self contained and not dependent on exotic launch mechanisms.

It is an object of the present invention to provide a launcher with a lifting mechanism for moving the aircraft onto the launch platform that can be operated by a single person and that does not require cable length adjustment to accommodate different lifting positions.

The above objects can be attained by a launch system that is contained in a portable trailer where all the components of the launch platform can be assembled by hand using lynch pins. The platform includes launch extension mechanisms that insure a proper launch angle even when the launch velocity is very high and the vehicle is heavily loaded. The launcher also includes a crane that provides a fixed position lifting crank and a movable boom with a lifting cable that is not exposed to getting tangled during movements of the boom. The trailer includes an air compressor and air tanks that supply compressed gas for a piston based launch mechanism. The system includes enclosed compartments that are capable of storing components for several vehicles. The system also includes an aircraft starter mechanism that can be positioned for starting a motor of the aircraft by the person controlling the launch and the flight of the craft.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
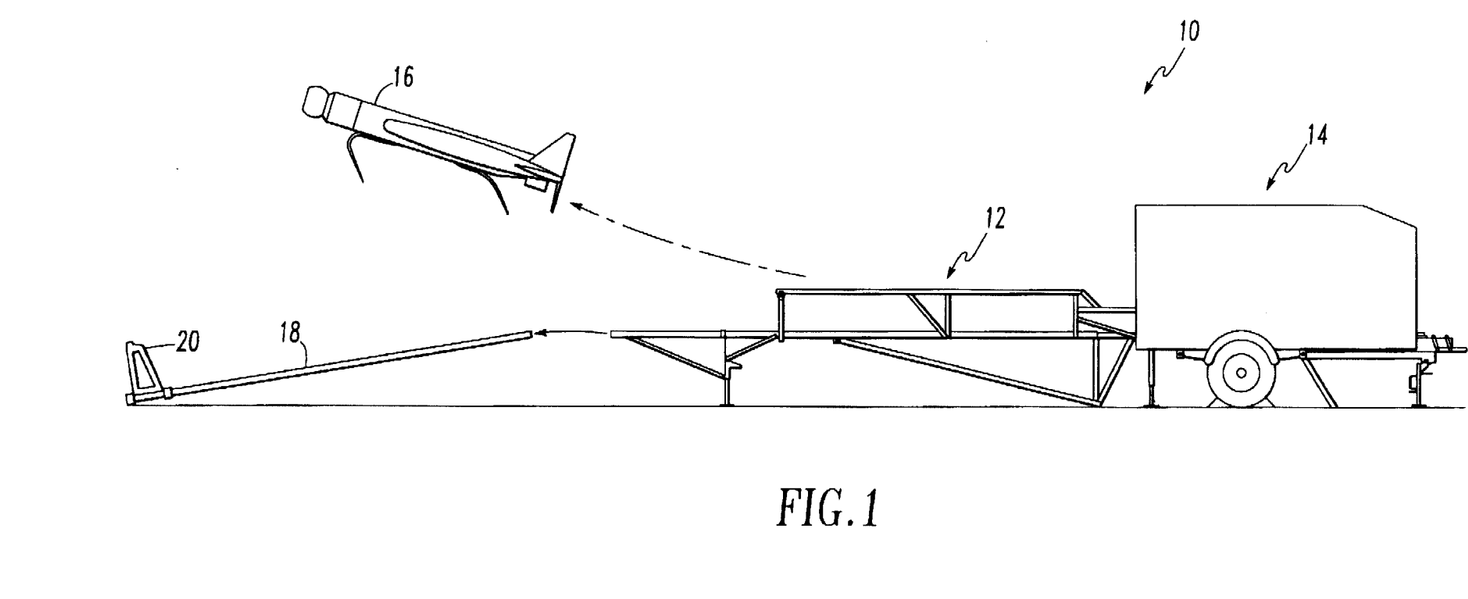
FIG. 1 is a diagram of a launch system according to the present invention.

The present invention, as illustrated in FIG. 1, comprises a trailer 10 that includes an extendable launch platform 12 associated with a trailer storage unit 14. An unmanned aerial vehicle (UAV) or aircraft 16 is launched from the platform 12 by pressurized air pushing a launch piston 18 out of a launch tube through a guide tube to accelerate the UAV 16 to about 60 miles per hour. The piston 18 includes a launch blade 20 that couples to and releases from the UAV 16, so that the piston 18 and blade 20 fall away from the UAV 16 after a launch as shown. This prevents the UAV 16 from having to carry the weight of the launch mechanism after it is airborne allowing heavier payloads.

Figure 2:
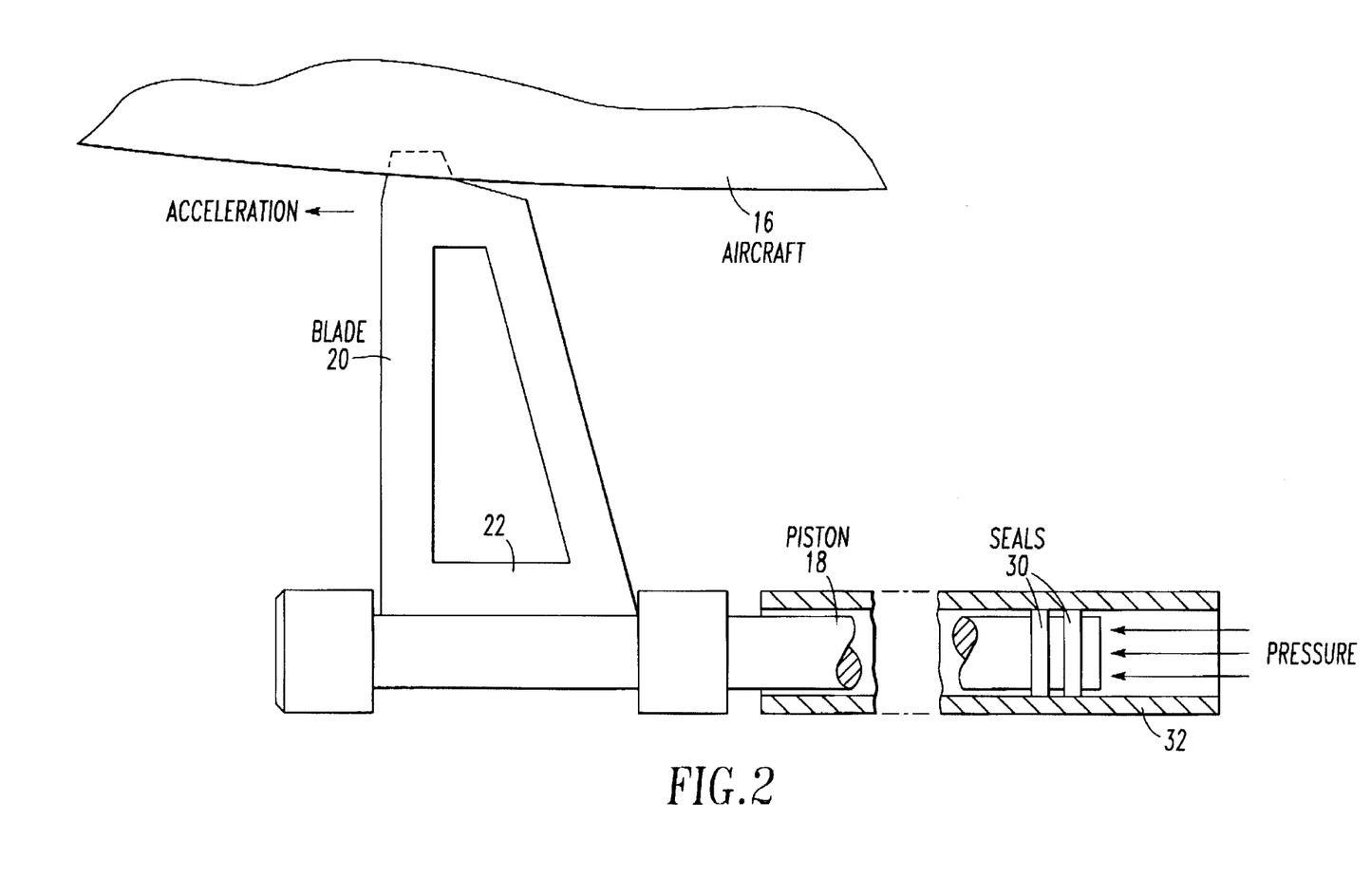
FIG. 2 illustrates a compressed air launch system of the present invention in more detail.

The piston 18 is preferably made of fiberglass that can be reinforced with carbon fiber. The piston 18, as shown in FIG. 2, includes conventional gas seals 30 that slide through the steel launch tube 32 as it is propelled by the pressurized air. The blade 20 is preferably made of steel but could also be made from reinforced fiber glass and includes a lynch pin hole 22 that is used to secure the piston 18 and blade 20 when in storage.

Figure 3:
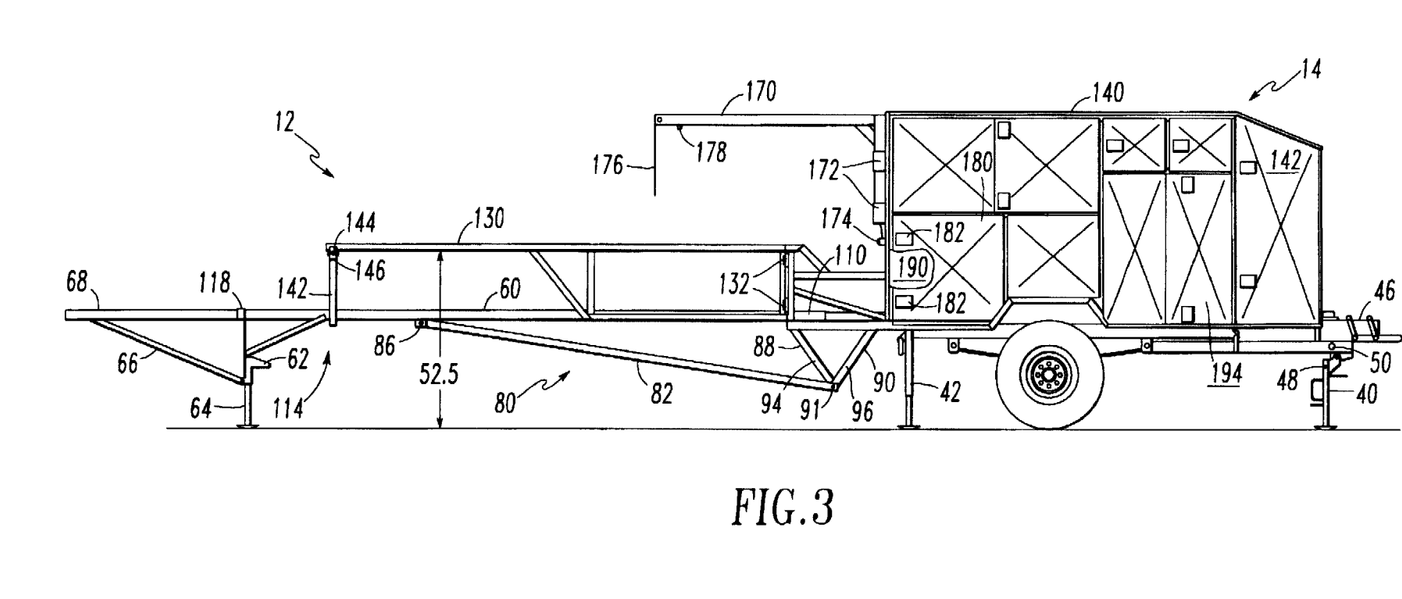
FIGS. 3 and 4 depict the system in a deployed state.

The launch system, when in the deployed configuration, includes three leveling jacks 40,42 and 44 that have been rotated into position as illustrated in the side view of FIG. 3. The jacks 40 and 42 are permanently fixed to frame 46 and are held in both the deployed and stored configurations (see FIG. 5) by conventional hitch pins with lynch pin retainers (not shown) that engage pin holes 48 and 50 shown for jack 40. All pins used in the present invention are hitch pins with pin retainers and include lanyards that are used to secure the various parts of the system, so that when the pins are not engaging parts together the pins do not fall away from the launcher and become lost. The jack 44 is attached to a removable, slotted steel guide tube 60. The jack 44 rotates into a storage position and is held in the storage position by a pin using holes 62 and 64 (see FIG. 3). In the deployed position the jack 44 is held in place by a supporting arm 66 of a guide tube extension 68. The extension 68 keeps the piston 18 traveling in a straight line until the end of the piston 18, where the seals 30 are located, has passed the beginning of the slot (see FIG. 4 for a view of the slot 116), so that the piston 18 does not flex while it is being driven and cause the UAV 16 to be launched at an improper angle.

The launch platform 12 also includes a support truss 80 (see FIG. 3) that supports the slotted guide tube 60 and includes a removable metal support 82 which is attached to the guide tube 60 at a guide tube support tab by a pin 86. The truss 80 is also formed using two pivoting metal supports 88 and 90 that are pivotally attached to the trailer frame 46 and attached to the removable support 82 by a pin 91. Each of the pivoting supports 88 and 90 include matching pin holes 94 and 96 that connect the supports 88 and 90 to each other when in the closed position and hold them up to the frame 46 of the trailer 10.

Figure 4:
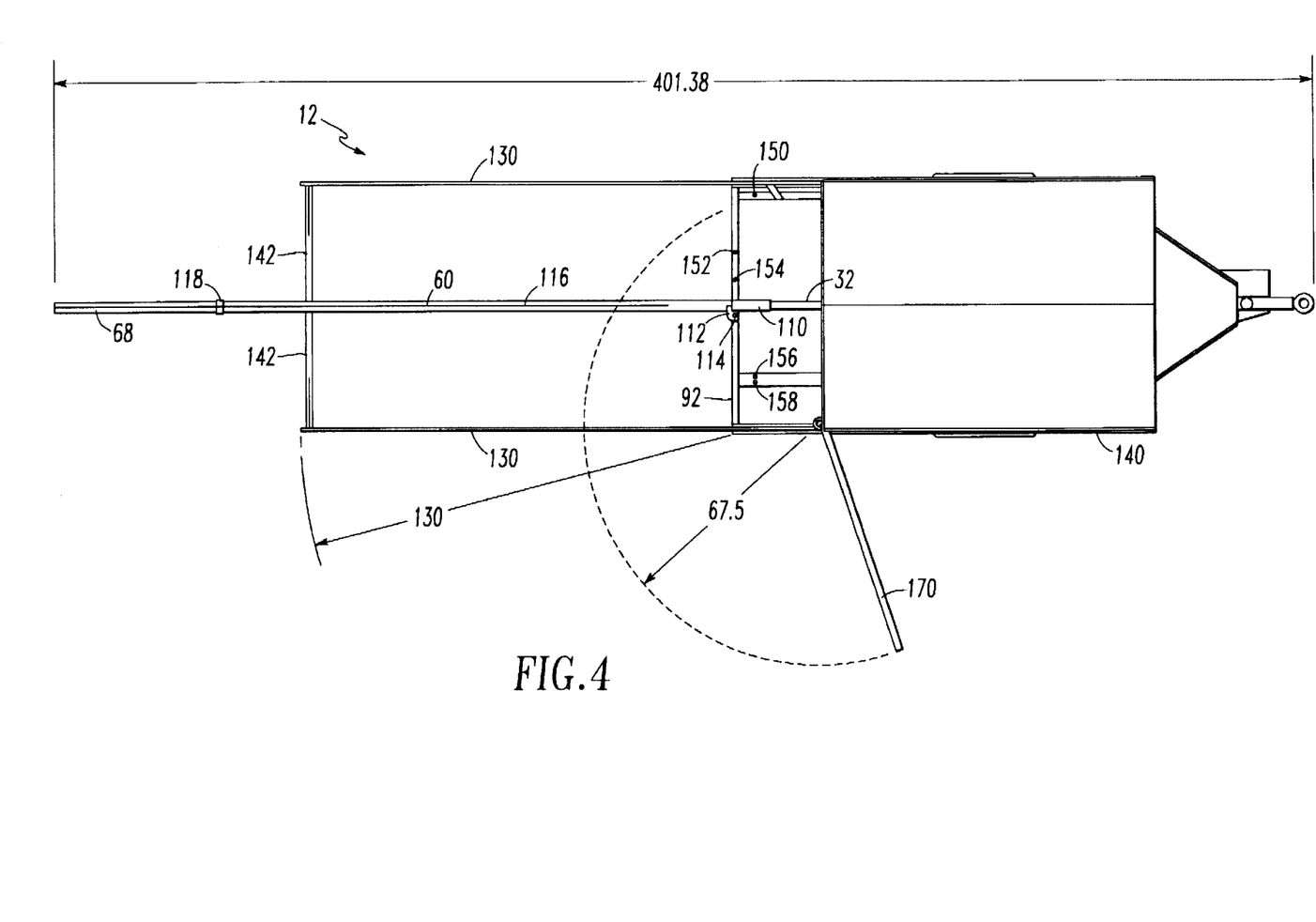
Figure 5:
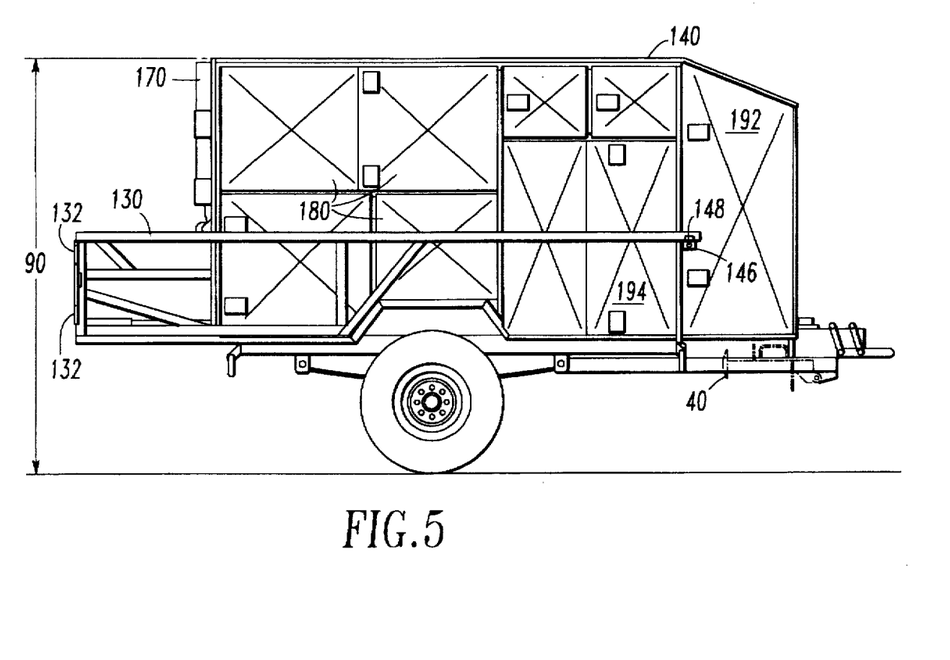
FIGS. 5 and 6 depict the system in a stored state.

The launch tube 32 is coupled to the slotted guide tube 60 by a metal sleeve 110 shown in both FIGS. 3 and 4. The guide tube 60 fits inside the sleeve 110 and is held in place by a tang 112 that is coupled to the launch platform frame 92 by a pin 114 best seen in the top view of FIG. 4. The launch blade 20, as the piston 18 is expelled by the launch tube 32, slides in the slot 116 of the guide tube 60 and guide tube extension 68 which is coupled to the guide tube 60 by a slotted sleeve 118.

Figure 6:
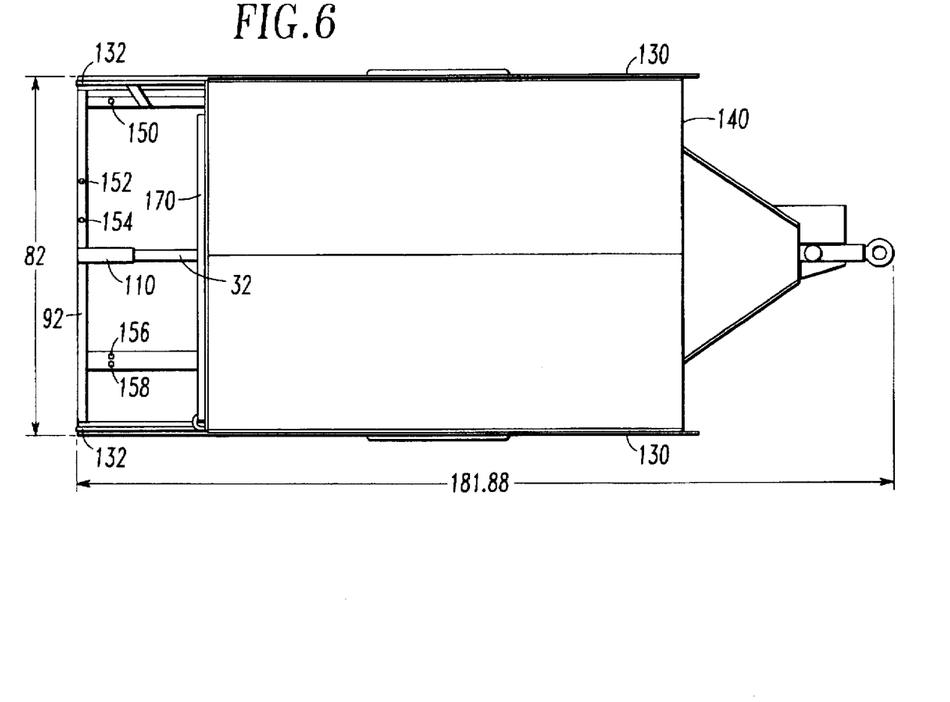

Wing rails 130 are also provided with the launch platform 12. These wing rails 130 are coupled to the frame 92 by hinges 132 that allow the wing rails 130 to swing up against the side of the trailer storage compartment 140 when in the storage position, as is more clearly shown in FIGS. 5 and 6. The wing rails 130 are supported at their outward ends by wing rail braces 142 (see FIGS. 3 and 4). The braces 142 are attached to the rails 130 by pins 144 that fit through holes in a rail flange 146. The flange 146 can be seen in FIG. 5 where the one of the rails is shown in the closed position with a pin 148 holding the folded rail against the side of the compartment 140. The braces 142 are secured to the guide tube 60 by pins that engage a flange (not shown) extending from the bottom of the tube 60.

The trailer 14 includes a longitudinal compartment (not shown) into which the launch tube and the other removable parts are stored. To secure these parts the frame includes pin holes 150,152,154,156 and 158 (see FIG. 4) that secure removable truss 82, the launch piston blade 20, the guide tube 60 and the braces 142, respectively. The extension 68 is secured to the back of the storage compartment 140 aligned parallel with the rear of the compartment 140.

The storage compartment 140 has a hollow crane 170 attached to one of the rear corners. The crane 170 swivels within bearings 172. A winch 174 is fixed to the side of the storage compartment 140 so that the winch 174 does not swivel with the crane 170. This prevents the winch 174 from being put in a position where the winch crank cannot be turned. A cable 176 passes through the hollow boom 170 over appropriate cable guides preventing the cable from tangling with objects on the exterior of the crane 170. The cable passing through the center also prevents the effective length of the cable from changing as the boom is moved. The crane is secured, in a non-movable position, to the side of the compartment 140 by a pin through a flange hole 178.

Each of the individual storage sections of the storage compartment 140 includes doors 180 with latches 182 allowing the sections to be opened from the rear. The interior of the storage compartment 140 is divided into open shelves that hold the parts of the UAV 16, such as wings, fuselages, engines, etc., as discussed in more detail in the related disclosure. The compartment 140 particularly includes a vehicle motor starter section 190, shown in the broken away portion in FIG. 3, that includes an electric starter, which will be discussed in more detail with respect to FIGS. 7 and 8, and compressed gas sections 192 and 194 which hold a compressor that slides partially out of the section 194 to allow the exhaust gas from the compressor engine to exhaust outside the compartment 140 and compressed air tanks for the propulsion system and which will be discussed in more detail with respect to FIG. 9.

Figure 7:
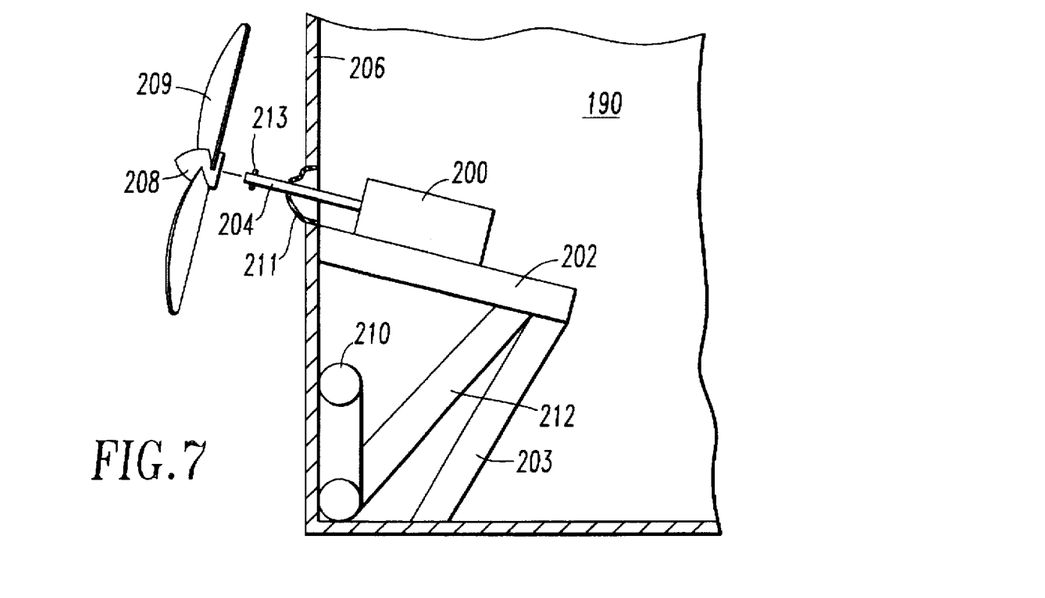
FIGS. 7 and 8 illustrate the starter motor and UAV coupling thereto.
Figure 8:
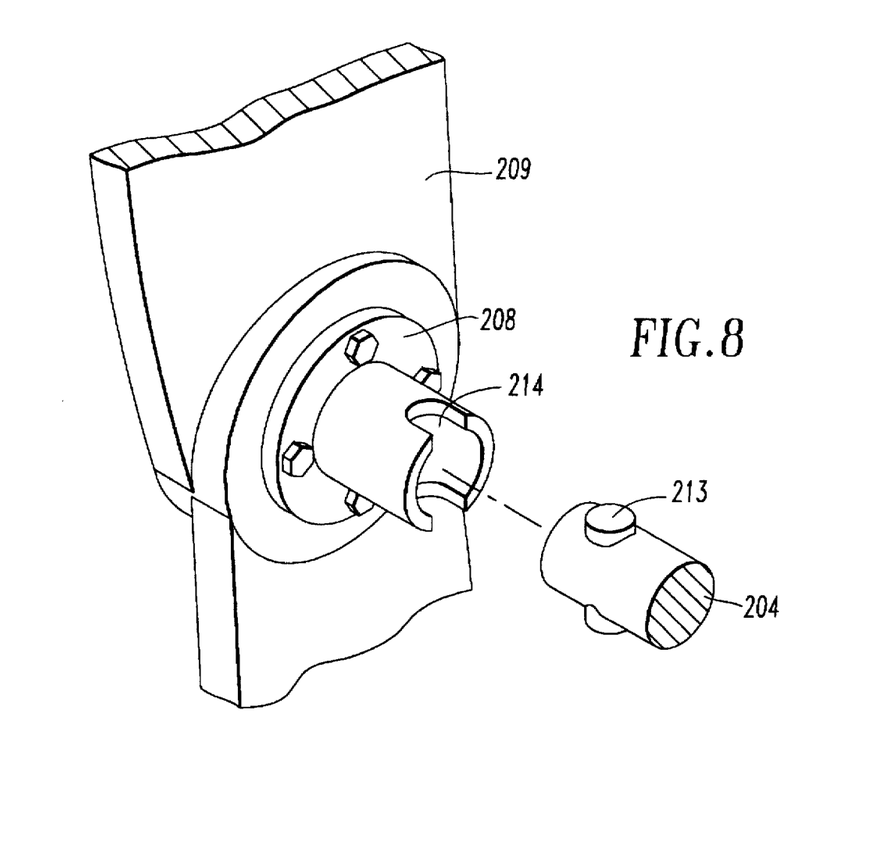

A conventional electric starter motor 200 is mounted on a railed slide ramp 202 supported by a frame 203 and includes a shaft 204 extending through the back 206 of compartment 140 as illustrated in FIG. 7. The shaft 204 engages a hub 208 of a propeller 209 of the UAV 16. A handle 210 and pivoting member 212 are used by the pilot to move (slide) the motor 200 and shaft 204 into engagement with the hub 208 when the UAV engine is to be started. When released, the motor 200 slides down the ramp 202 and is disengaged from the hub 208. The hole in the back wall 206 through which the shaft 204 protrudes is covered by a flexible rubber boot 211 that prevents rain from entering the compartment 140. The shaft 204 (see FIG. 8) includes a pin 213 that engages a slot 214 in the hub 208 to turn the propeller 209 and engine to start the same.

Figure 9:
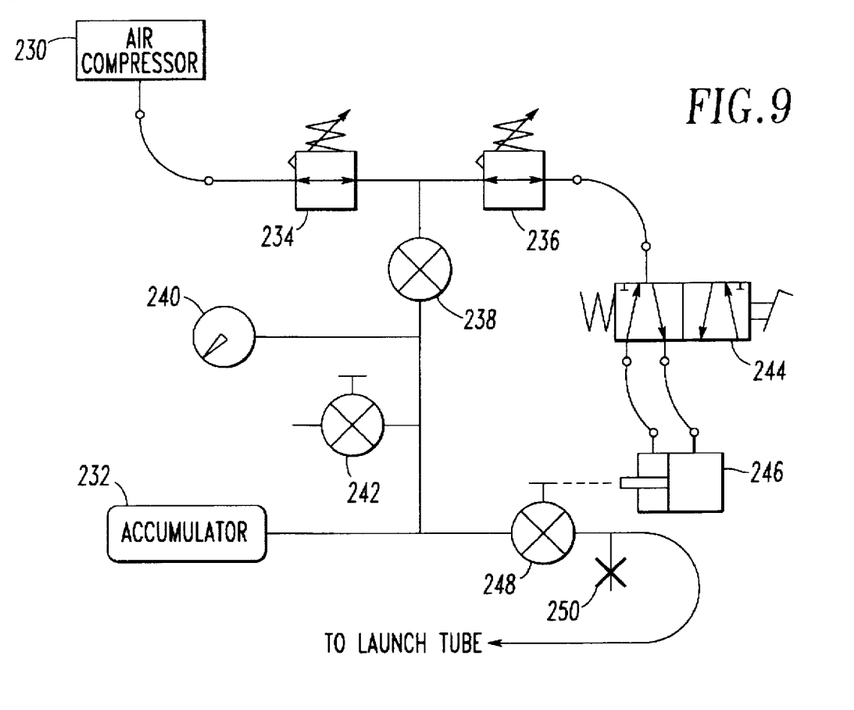
FIG. 9 depicts the gas control components of the air propulsion launcher.

The propulsion system includes a liquid fueled air compressor 230 of the type that is used to compress and dry air used to fill scuba tanks, as illustrated in FIG. 9. However, it is important that the compressor engine be capable of running on the same fuel as the engine of the UAV. The compressor provides the compressed air through a hose and valve system to a storage tank or accumulator 232. The hose and valve system includes an adjustable high pressure regulator 234 connected to the compressor 230, to a fixed low pressure regulator 236 and a charge valve 238. A charge valve pressure gauge 240 monitors pressure in the accumulator 232 and a dump valve 242 releases excess gas pressure. A second set of hoses and valves provides the compressed air to the launch tube 32 and is activated by a foot operated valve control unit 244 that allows the UAV pilot to control the launch of the UAV 16. The foot valve 244 controls the flow of air to and from an actuator piston 246 which operates a launch valve 248 connected between the tank 232 and the launch tube 32. The foot valve 244 is connected to the regulator 236 and actuator piston 246 by quick connect air hose connectors. An overflow valve 250 dumps excess gas when the gas is provided to the launch tube 32. The regulators, particularly the variable pressure regulator 234 allows the launch pressure and, thus, the launch velocity to be controlled to vary the launch pressure depending on the load of the vehicle 16.

Figure 10:
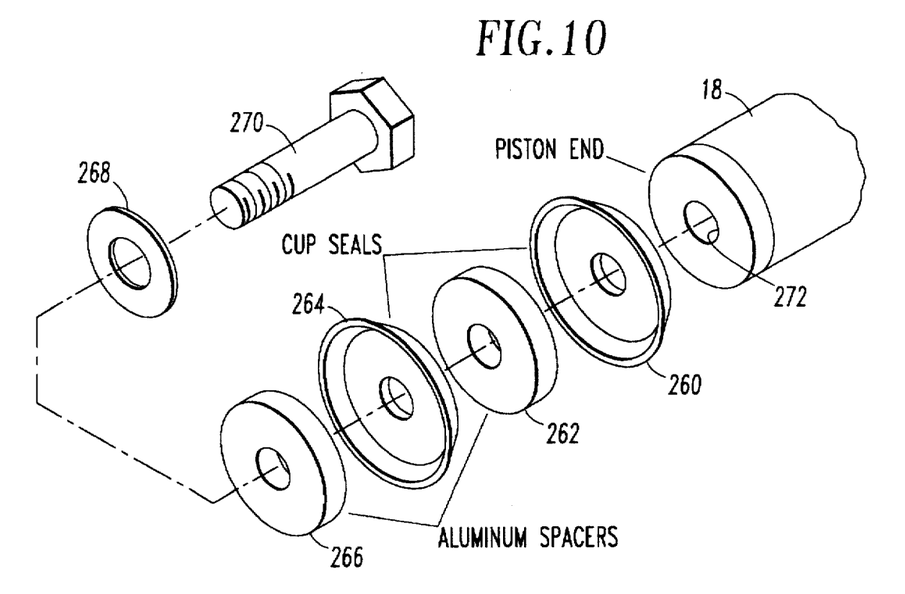
FIG. 10 depicts a double seal for the launch piston and launch tube.

To improve efficiency and improve launch velocity control the present invention provides a double seal on the end of the launch piston 18, as illustrated in FIG. 10, to provide improved sealing within the launch tube 32. A first cup seal 260 abuts the end of the piston 18. A metal (aluminum) space 262 is provided between the first cup seal 260 and a second cup seal 264. The second seal 264 abuts a second spacer 266 and the entire seal assemble is held in place by a washer 268 and a bolt 270 that fits in a threaded hole 272 in the piston 18.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A launching system for an unmanned aircraft, comprising:
   a portable trailer;
   a launch platform including removable pin connections for assembling said platform extending from a rear of said trailer;
   an air compressor providing compressed air;
   an air tank coupled to said compressor for storing said compressed air;
   a valve coupled to said tank for releasing said compressed air;
   a launch tube coupled to said valve for receiving said released compressed air;
   a guide tube coupled an end of said launch tube; and
   a launch piston coupled to the aircraft and propelled from said launch tube and said guide tube by said compressed air.

2. A system as recited in claim 1, wherein the aircraft includes an engine and further comprising a retractable starter motor engaging said engine of the aircraft.

3. A system as recited in claim 1 wherein said launch platform includes:
   a guide tube extension coupled to said guide tube for guiding said piston until said piston exits said launch tube.

4. A system as recited in claim 1, further comprising a storage compartment mounted on said trailer and adapted to store parts for several aircraft.

5. A system as recited in claim 4, further comprising:
   a hollow pivoting crane mounted on said compartment and having a lifting cable threaded therethrough; and
   a non-movable winch attached to said compartment and winching the cable.

6. A system as recited in claim 1, wherein said launch platform comprises:
   a launch tube having a sleeve and a pin receiver; and
   a guide tube fitting into the sleeve and having a tang connectable to said pin receiver.

7. A system as recited in claim 6, further comprising a support truss attachable to said guide tube and including:
   a removable support, said removable support being pin attachable to said guide tube; and
   first and second pivoting supports pivotally attached to said trailer and pin connectable to said removable support.

8. A system as recited in claim 7, wherein said first and second pivoting supports fold up under said trailer and are held in a storage position by a single pin.

9. A system as recited in claim 6, further comprising:
   pivoting wing support rails pivotally attached to said trailer; and
   wing braces, said wing braces being pin attachable to said guide tube and said rails.

10. A system as recited in claim 6, further comprising a pin positionable pivoting support jack attached to said guide tube.

11. A system as recited in claim 1, further comprising pin positionable leveling jacks attached to said trailer.

* * * * *